May 31, 1960     K. SCHLUCKEBIER     2,939,039
MARKER LINE GENERATOR FOR SWEEP RASTER
Filed Aug. 10, 1959
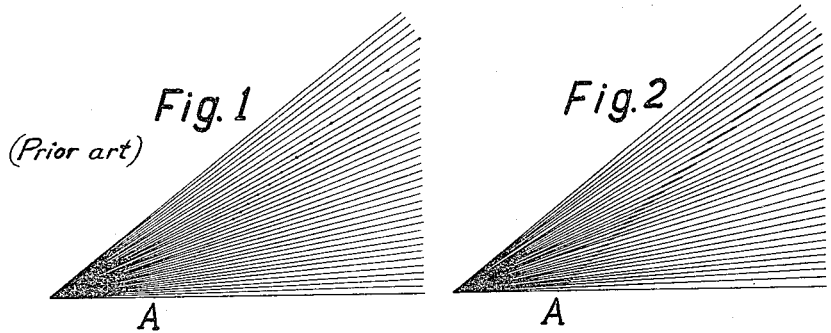
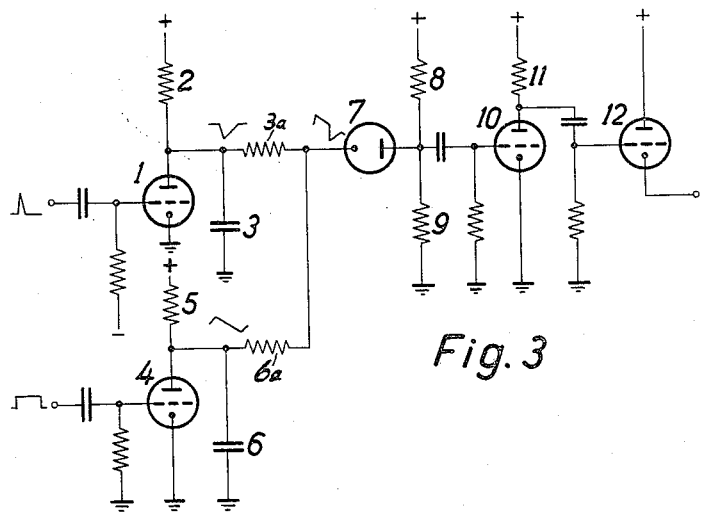
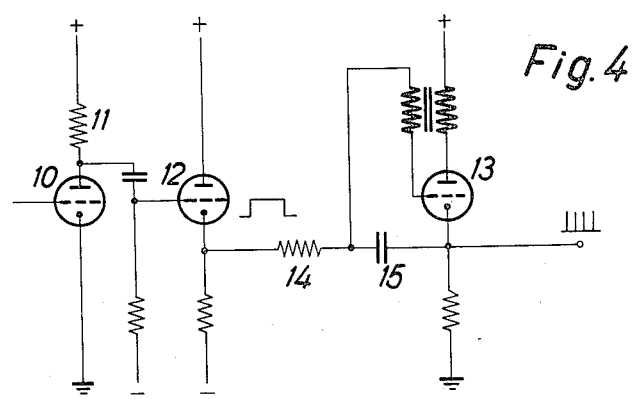
Inventor:
Konrad Schluckebier United States Patent Office 2,939,039
Patented May 31, 1960

2,939,039

MARKER LINE GENERATOR FOR SWEEP RASTER

Konrad Schluckebier, Ulm (Danube), Germany, assignor to Telefunken G.m.b.H., Berlin, Germany Filed Aug. 10, 1959, Ser. No. 832,663

Claims priority, application Germany Aug. 13, 1958

5 Claims. (Cl. 315—22)

The present invention relates to means for producing marker lines on the sweep rasters of cathode ray presentations.

The problem of producing marker lines on the screen of a cathode ray tube occurs frequenly in radar apparatus. It is an undesirable feature that such marker lines appear to decompose into a number of light spots when the marker lines intersect the raster lines at small angles. This apparent decomposition of the marker line is disadvantageous since the resulting spots of the marker line may be mistaken for targets.

Figure 1 shows a prior art presentation, wherein the marker lines appear to decompose into a number of light spots in which the elevational indication for the socalled GCA (ground-controlled approach) is presented. With this type of indication of elevation, the electron beam is deflected along polar coordinates. The marker line, apparently, decomposing into individual light spots represents the prescribed approach landing path. The intersection of said line with the horizontal is the touch-down point A. Figure 1 shows that the distance between the light spots actually increases as the spots appear further away from the origin of the coordinates.

It is an object of the present invention to produce marker lines by simple means, said lines not decomposing into light spots, but remaining of substantially constant density across the raster.

It is another object of this invention to provide in an arrangement for producing marker lines on the screen of a cathode ray tube, for example in a radar apparatus, means for avoiding the apparent decomposition of the marker lines into a number of light spots where these lines intersect the lines of the deflection raster at small angles, said means extending the brightening pulses for the marker lines to such an extent, that the impression of a continuous line is thereby obtained.

The principle of the present invention will be explained with reference to the pictorial presentation of Figure 2, while Figure 3 shows a circuit diagram of an embodiment of the invention.

Figure 4 shows a modified circuit embodiment of the invention.

Figure 2 illustrates an elevation presentation of a ground-controlled approach radar apparatus analogous to that of Figure 1. In accordance with this invention, the brightening pulses are extended in their duration to illustrate the prescribed landing path, so that, at each radial deflection, a dash rather than a point is traced to form a part of the marker line.

It is a further object of this invention to extend the light dashes in proportion to the distance in which they appear from the origin of the coordinates, so that a steplike marker line is obtained which appears to the human eye as a continuous line.

In the drawings, the number of radial sweeps is selected relatively small, i.e., actually, the radial deflections of the electron beam will be much closer to one another than shown in the drawing, so that the marker lines are interrupted less apparently than shown in Figure 2.

Figure 3 illustrates a circuit by which such prolonged light-scanning pulses are produced. Short positive pulses are fed to the grid of a tube 1. These are the pulses which can be directly used for brightening of the electron beam to produce known marker lines. Upon reception of the short brightening pulses, the tube 1 briefly passes anode current and thereby rapidly discharges a small condenser 3. This condenser is charged relatively slowly via a high resistance 2, so that triangular negative pulses are obtained across the condenser 3, said pulses having a short rise and a longer decay period. Such a pulse is schematically indicated above the condenser 3.

A positive rectangular pulse is fed to the grid of a tube 4, said pulse starting at and ending at the radial deflection limits of the electron beam. A sawtooth voltage decreasing from the positive starting value during the radial deflection of the electron beam is produced across a condenser 6 by alternate discharge through the tube 4 and subsequent charge via a resistance 5, said condenser 6 being large with respect to the condenser 3. The sawtooth voltage is symbolically indicated above the condenser 6. The voltages across the condensers 3 and 6 are fed together via two resistances 3a and 6a and are applied to a diode 7, so that a composite voltage is obtained, as symbolically indicated in front of the diode 7. This diode 7 is biased by means of a voltage divider 8, 9 in such a manner, that it permits only the negative peaks of the composite voltage to pass. The circuit is designed so that the triangular pulses derived from the condenser 3 are passed, said voltages having an amplitude varying according to the duration of the scanning pulses and, thereby, of the triangular pulse derived from the condenser 3 and the sawtooth voltage derived from the condenser 6. The negative triangular pulses thus obtained are limited by a tube 10 and are reversed with respect to polarity. Rectangular pulses are thus obtained across the anode resistance 11 of the tube 10, whereby the duration of these pulses varies in accordance with the amplitude of the composite voltage at the phase position of the pulse supplied to the tube 1. These continuously varied brightening pulses are fed to the control grid of the cathode ray tube via a tube 12.

A further development of the invention will be described in the following, this development, however, not possessing certain disadvantages of the system described in the foregoing, according to which the produced marker lines have different light intensities, due to the different lengths of the dashes. According to the invention, it is possible to produce a marker line of uniform brightness by making the amplitudes of the brightening pulses for the marker lines inversely proportional to the duration of the pulses. However, such solution cannot be used if, as in television and radar apparatus, the brightness of the picture is to be modulated. In such case, parts of the marker line recorded with low amplitude could not be seen when the brightness is decreased during modulation.

The system of Figure 4 is a modification of the system of Figure 3 which is characterized by prolongation of the pulses which, heretofore, have been used as brightening pulses by conversion thereof into several short pulses which are then fed to the brightness modulated electrode of the cathode ray tube, so that continuous marking lines of uniform brightness are produced.

In Figure 4, the same tube 10 as illustrated in Figure 3, likewise, serves to limit the triangular pulses and to reverse their polarity, so that at the output of the tube 10 rectangular pulses are obtained. In the system according to Figure 3, these pulses are fed directly to the brightness-modulated electrode of the cathode ray tube via a tube 12. However, in Figure 4, the tube 12 drives a cathode resistance to which a freely-oscillating blocking oscillator 13 is connected. The pulse appearing at the output of the tube 12 is used to trigger the blocking oscillator 13 which, normally, is biased beyond cut-off by a negative grid bias voltage. This negative bias voltage is applied to one grid and, thereby, also to the cathode of the tube 12. The positive pulse renders the cathode of the tube 12 positive with respect to the cathode of the tube 13, whereby the blocking oscillator 13 is triggered to oscillate freely and series of marker spikes are obtained, the periods of which are determined by the time constant of the RC member 14, 15.

Other spike generators for converting the long pulse into a series of short spikes may be used in place of a blocking oscillator.

The spike generator is suitably connected in such a manner that the spikes generated thereby produce light spots on the screen of the cathode ray tube.

The novel principles of this invention are broader than the specific embodiments recited above and rather than unduly extend this disclosure by attempting to list all the numerous modifications which have been conceived and reduced to practice during the course of this development, these novel features are defined in the following claims.

I claim:

1. In radar-type apparatus having on the screen of a cathode ray tube a line raster to be intensity-modulated by a cathode ray beam control electrode and having brief marker pulse generating means producing a marker of in-line bright spots disposed across the screen at an angle to the lines of raster, a circuit for eliminating the apparent decomposing of the marker into individual spots comprising electronic means connected to receive said brief marker pulses and delivering series of brightening pulses of a duration at least substantially equalling the interval between adjacent brief pulses, whereby the marker appears to be a substantially continuous marker line.

2. In apparatus as set forth in claim 1, said raster being based on polar coordinates and the raster lines all emanating from an original point, said marker diagonally intersecting the raster lines so that the spacing increases from bright spot to bright spot across the raster, and said circuit including brightening pulse duration varying means, whereby the duration of successive brightening pulses is increased from pulse to pulse across the raster.

3. In apparatus as set forth in claim 2, said circuit comprising a triangular pulse generating means connected to receive said brief pulses and delivering triangular pulses of constant shape phase-locked therewith; sawtooth wave generating means triggered on and off respectively by the beginning and end of each raster line sweep and of a duration proportional to the length thereof; means for superimposing each triangular pulse on the corresponding sawtooth wave to form a composite voltage wave; and rectangular brightening pulse generating means initiating the generation of each pulse at the instant of said triangular pulse initiation and sustaining the brightening pulse for a duration determined by the amplitude of the composite wave at the location of the triangular pulse on the sawtooth wave.

4. In apparatus as set forth in claim 3, said circuit further comprising marker spike generating means normally biased beyond cut-off and connected with said brightening pulse, whereby the presence of each brightening pulse biases the spike generating means to initiate a series of spikes and wherein the duration of each series equals the duration of each brightening pulse.

5. In apparatus as set forth in claim 4, said spikes being connected to said control electrode, and said spike generating means comprising a blocking oscillator.

References Cited in the file of this patent
UNITED STATES PATENTS

| | | |
|---|---|---|
| 2,425,330 | Kenyon | Aug. 12, 1947 |
| 2,533,670 | Hart | Dec. 12, 1950 |
| 2,566,332 | Huber | Sept. 4, 1951 |
| 2,702,899 | Page | Feb. 22, 1955 |
| 2,768,323 | Schonover | Oct. 23, 1956 |